United States Patent [19]

Rodriguez

[11] 4,043,045

[45] Aug. 23, 1977

[54] SINE BAR GAGE SET AND ASSEMBLY WITH DIRECT-READING ANGLE INDICIA

[75] Inventor: Joseph M. Rodriguez, San Jose, Calif.

[73] Assignee: Select Metal Products Inc., Santa Clara, Calif.

[21] Appl. No.: 671,566

[22] Filed: Mar. 29, 1976

[51] Int. Cl.² .............................................. G01B 3/32
[52] U.S. Cl. ................... 33/174 S; 33/168 R; 33/174 H; 206/305
[58] Field of Search ............. 33/168 R, 174 H, 174 S, 33/174 TC; 206/44.12, 77, 305, 372, 443, 445, 446

[56] References Cited

U.S. PATENT DOCUMENTS

| 547,549 | 10/1895 | Hood | 206/305 |
|---|---|---|---|
| 2,075,008 | 3/1937 | Damm et al. | 33/174 S |
| 2,345,708 | 4/1944 | Lines | 33/174 S |
| 2,579,449 | 12/1951 | Jahrl | 33/174 S |
| 3,279,081 | 10/1966 | Gillis et al. | 33/174 S |

FOREIGN PATENT DOCUMENTS

| 11,767 | 8/1901 | United Kingdom | 33/168 R |
| 559,748 | 3/1944 | United Kingdom | 33/174 H |

Primary Examiner—Richard E. Aegerter
Assistant Examiner—Richard R. Stearns

[57] ABSTRACT

A set of direct-reading sine bar gages has been provided in which each of the gage elements is marked with a number corresponding to the associated angle of elevation of the sine bar when that particular element is disposed beneath the sine bar. Accordingly, when the technician is seeking to elevate the sine bar to a particular angle the technician needs only to inspect the various gage elements to determine which of them is marked with a number corresponding to the angle which he desires. A carrying tray holds each of a predetermined number of gage elements forming the set. The tray includes a base of predetermined thickness with openings formed into the base to snugly receive each of the gage elements of the set. Vent openings form flow passages between the first named openings and the surrounds. When the elements are disposed within their respective openings, the vents prevent the gage elements from being locked by vacuum within their respective openings.

3 Claims, 4 Drawing Figures

U.S. Patent  Aug 23, 1977  Sheet 1 of 2  4,043,045
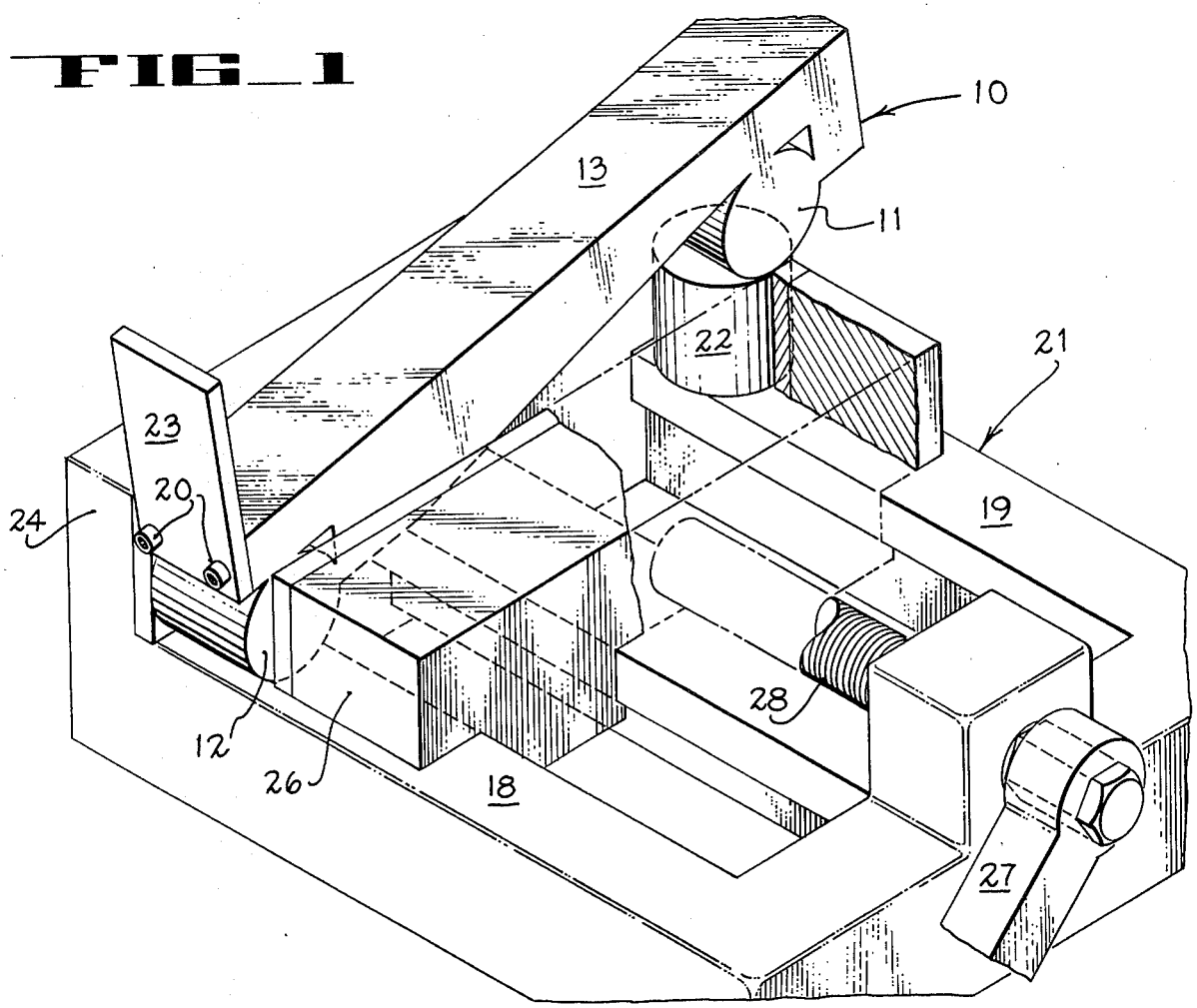
FIG_1
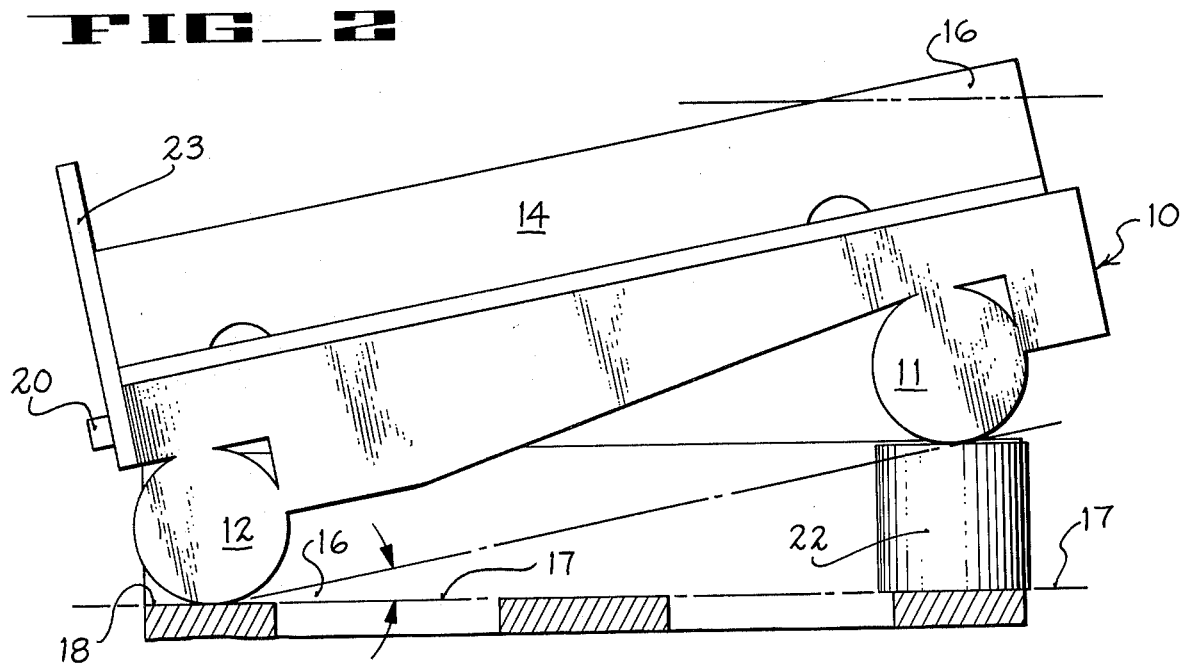
FIG_2

U.S. Patent  Aug 23, 1977  Sheet 2 of 2  4,043,045
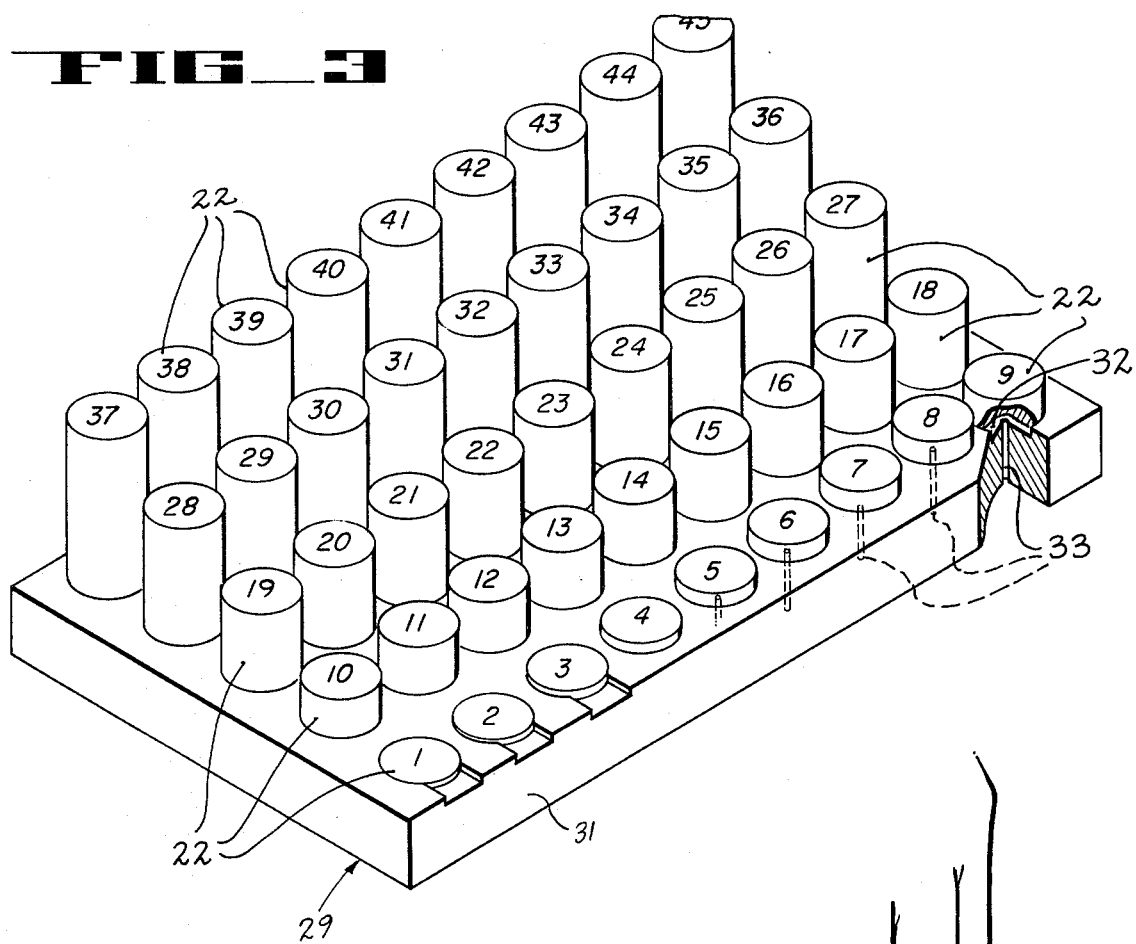
FIG_3
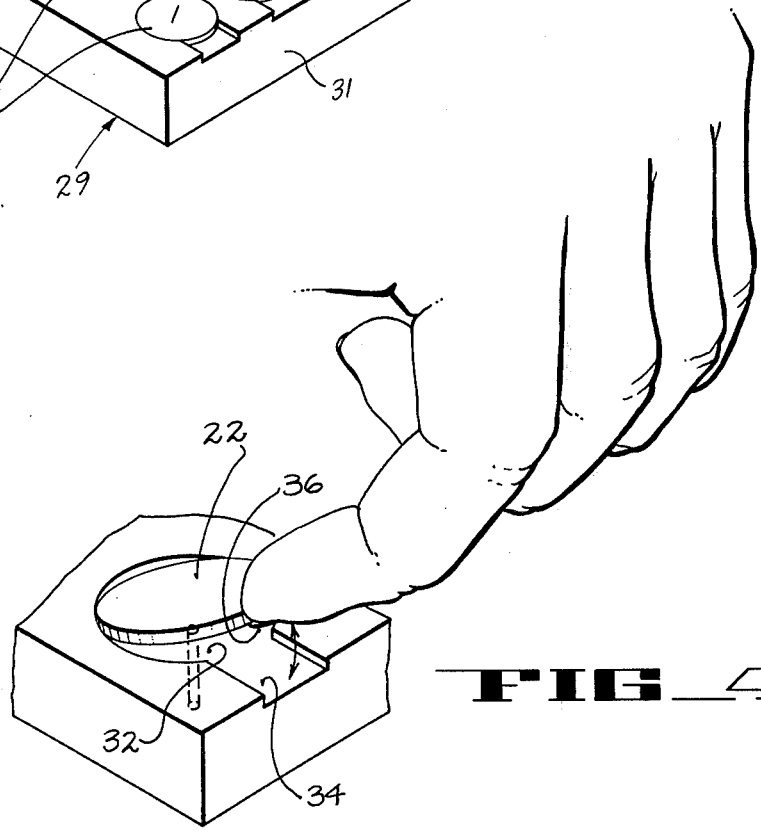
FIG_4

SINE BAR GAGE SET AND ASSEMBLY WITH DIRECT-READING ANGLE INDICIA

BACKGROUND OF THE INVENTION

This invention pertains to a sine bar gage set of a type used, for example, by technicians and others in disposing a work piece to be trimmed, cut or milled at a particular angle, and more particularly to such a set of gage elements where each is marked with indicia directly identifying the angle, i.e. marked with the angle thereon, and an assembly maintaining such elements in a predetermined organization.

Sine bars measure angles accurately and locate work at a desired angle to some other reference surface or plane. They frequently are used in conjunction with some true surface such as a horizontal surface from which measurements can be taken, preferably a thoroughly clean surface plate. The exact degree of angularity which a five-inch or ten-inch sine bar makes with a plane surface has in the past been obtained by calculating or otherwise determining the precise vertical height of one end. The correct combination of linearly measured gage blocks placed beneath the elevated end of the sine bar provides the appropriate height to establish the calculated angle desired. A technician is required either to calculate through trigonometric functions the exact amount of linear gage blocks which are to be employed or refer to a table of constants to provide the height for the various angles.

As will be readily evident from the foregoing description, when it is desired to tilt the sine bar at a given angle, selection of the right combination of linearly measured gage blocks will be necessary to be inserted beneath the elevated end of the sine bar. In selecting the height of the gage blocks using the foregoing arrangement it is further evident that the possibility of error is significant due to the need for calculations of the trigonometric function or in using a reference table or chart.

As disclosed herein a set of direct-reading sine bar gages has been provided in which each of the gage elements is marked with a number corresponding to the associated angle of elevation of the sine bar when that particular element is disposed beneath the sine bar. Accordingly, when the technician is seeking to elevate the sine bar to a particular angle the technician needs only to inspect the various gage elements to determine which of them is marked with a number corresponding to the angle which he desires.

OBJECTS AND SUMMARY OF THE INVENTION

In general, a set of sine bar gage elements for use in conjunction with a sine bar unit adapted to support an article to be marked cut or milled at a selected angle with respect to the horizontal, each of the elements being marked with the number of an angle. The elements are adapted to be disposed beneath one end of the sine bar unit and are provided with a height serving to elevate that end with respect to the other so as to dispose the surface of the sine bar at an angle with respect to a reference plane corresponding to the number of the angle marked on the sine bar gage element disposed beneath the unit.

In addition to the above, a carrying tray holds each of a predetermined number of gage elements forming the set. The tray includes a base of predetermined thickness with openings formed into the base to snugly receive each of the gage elements of the set. Vent openings form flow passages between the first named openings and the surrounds. When the elements are disposed within their respective openings, the vents prevent the gage elements from being locked by vacuum within their respective openings.

In general, it is an object of the present invention to provide an improved sine bar assembly including improved gage elements for direct reading of the angles to be achieved by the sine bar when inserted beneath one end thereof.

Another object of the invention is to provide an improved set of sine bar gage elements and a carrying tray for same in which the gage elements are snugly retained within their respective positions in the tray.

The foregoing and other objects of the invention will become more readily evident from the following detailed description of a preferred embodiment when considered in conjunction with the drawings.

BRIEF DESCRIPTION OF THE DRAWINGS

FIG. 1 shows a perspective view, with portions broken away and in phantom lines, of a sine bar assembly held in position by a vise.

FIG. 2 shows a diagrammatic side elevation view of a sine bar assembly of the type shown in FIG. 1 with a work piece thereon.

FIG. 3 shows a perspective view, partially broken away for clarity, of a set of direct-reading sine bar gage elements according to the invention; and FIG. 4 shows a perspective view in enlarged detail of the nearest corner of the assembly shown in FIG. 3.

DETAILED DESCRIPTION OF PREFERRED EMBODIMENTS

A sine bar unit 10 of predetermined length or spacing as measured between the contact or supporting points beneath cylindrically-shaped portions 11, 12 includes a flat, planar surface 13 adapted to support an article 14 (FIG. 2) to be marked, cut or milled at a selected angle 16 with respect to a reference plane, such as the horizontal plane 17 defined by top surface portions 18, 19 of a vise assembly 21.

As shown best in FIG. 3 each of the sine bar gage elements 22 is marked with the number of an angle such as numbers 1 through 45 associated with gage elements 22 for angles 1° – 45°. The elements are adapted to be disposed under end 11 of unit 10 and have a height serving to elevate end 11 of unit 10 with respect to the other end sufficiently to dispose the surface 13 at an angle 16 with respect to reference plane 17. The height associated with each gage element 22 develops an angle corresponding to the number marked on the gage element 22 so disposed beneath the sine bar.

At the foot of sine bar 10 a fixed stop 23, secured by means of Allen screws 24 to the end of sine bar 10 holds work piece 14 from sliding downwardly along surface 13 while in its tilted position.

In operation, sine bar 10 is disposed between the jaws 24, 26 of vise assembly 21 with the bottom of portion 12 resting on the top of surface portion 18 defining, in conjunction with the top surface of portion 19, reference plane 17. A direct angle reading gage element 22 is disposed on the top surface of portion 19 in supporting relation to cylindrical portion 11 so as to tilt surface 13 at the angle corresponding to the angle indicated on the selected gage element 22.

In order to maintain the foregoing relationship, jaws 24, 26 of vise assembly 21 are closed tightly against the sine bar assembly by means of the crank arm 27 which rotates the screw drive 28 coupled to jaw 26.

From the foregoing it will be readily evident that there is provided a direct-reading sine bar gage element 22 which a technician can select and directly determine the desired angle merely from reading the indicia carried by the gage element itself.

The set of gage elements 22 are preferably disposed in a carrying tray 29 having a base 31 of predetermined thickness. Pockets or openings 32 formed into base 31 serve to snugly receive gage elements 22 of the set.

Vents or flow passages 33 serve to couple the pockets 32 to vent them to the surrounds when gage elements 22 are disposed within their respective pockets so as to prevent gage elements 22 from being locked or held by vacuum within their respective pockets or openings. The foregoing vents 33 are important to the carrying tray 29 in view of the fact that it permits the gage elements 22 to be tightly fitted within their respective pockets so that tray 29 can be handled without too much concern for causing the elements to fall out of the tray. On the other hand, without the presence of vents 33, gage elements 22 would necessarily need to be far more loosely disposed within base element 31 with greater attendant risk of loss.

For those gage elements 22 representing an angular elevation of one, two and three degrees it is necessary that the pocket be sufficiently deep to hold the gage element while at the same time the gage element will not be sufficiently tall to provide much exposed material, if any, above the top surface of base 31 to permit ready removal of these thin gage elements. Accordingly, pockets 32 for these gage elements are bounded by a relieved portion 34 of the sidewall of the pocket such as to accommodate entry of a fingernail 36 for engaging one of elements 22 in the shallow opening or pocket 32.

From the foregoing it will be readily evident that the carrying tray with its complete set of gage elements 22 provides a very simple and easy selection of appropriate gage elements to establish a given angle for sine bar 10. In view of the fact that each gage element carries associated indicia related to its height and directly designating the angle of sine bar 10 which it will establish when disposed between one end of sine bar 10 and a reference plane such as defined by the top surfaces of vise portions 18, 19, use of these elements eliminates time lost by a technician in computing the number of linearly measured gage elements required to establish a desired angle. Also, the possibility of erroneous computation is significantly reduced.

What is claimed is:

1. A set of sine bar gage elements for use in conjunction with a sine bar unit of predetermined length having a surface thereon adapted to support an article to be marked, cut, milled or the like at a selected angle with respect to a reference plane, each said element being marked with the number of an angle, said elements being adapted to be disposed between the reference plane and one end of said sine bar unit and having a height serving to elevate said one end with respect to the other to dispose said surface at an angle with respect to the reference plane corresponding to the number of the angle as marked on said element disposed beneath said one end of said unit, said set including a carrying tray for holding each of a predetermined number of said gage elements forming said set, said tray including a base of predetermined thickness, openings formed into said base dimensioned to snugly receive each of said gage elements of said set, and vent openings coupling the bottoms of said first named openings to the surrounds when the elements are disposed within said first named openings to prevent the gage elements from being retained by vacuum within the first named openings.

2. A carrying tray for holding each of a predetermined number of gage bar elements forming a set thereof, said tray including a base of predetermined thickness, openings formed into said base to snugly receive each of the gage elements of the set, and vent openings coupling the bottoms of said first named openings to the surrounds when the elements are disposed within said first named openings to prevent the gage elements from being retained by vacuum within the first named openings.

3. A carrying tray for holding each of a predetermined number of gage bar elements according to claim 2 in which at least one of the first named openings is bounded by a relieved portion of the sidewall thereof serving to accommodate entry of a fingernail for engaging one of said elements in said one opening.

* * * * *